United States Patent
Ash et al.

(10) Patent No.: US 7,761,680 B2
(45) Date of Patent: Jul. 20, 2010

(54) COPYING DATA FROM A FIRST CLUSTER TO A SECOND CLUSTER TO REASSIGN STORAGE AREAS FROM THE FIRST CLUSTER TO THE SECOND CLUSTER

(75) Inventors: Kevin John Ash, Tucson, AZ (US); Lokesh Mohan Gupta, Tucson, AZ (US); Steven Robert Lowe, Tucson, AZ (US); Alfred Emilio Sanchez, Tucson, AZ (US); Kenneth Wayne Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 11/696,099

(22) Filed: Apr. 3, 2007

(65) Prior Publication Data

US 2008/0250210 A1   Oct. 9, 2008

(51) Int. Cl.
*G06F 12/00* (2006.01)
(52) U.S. Cl. .................. 711/165; 711/162; 711/120
(58) Field of Classification Search ................ 711/165, 711/162, 120
See application file for complete search history.

(56) References Cited

U.S. PATENT DOCUMENTS

| 6,006,342 | A | 12/1999 | Beardsley et al. |
| 6,260,125 | B1 | 7/2001 | McDowell |
| 6,591,335 | B1 | 7/2003 | Sade et al. |
| 7,051,174 | B2 | 5/2006 | Ash et al. |
| 7,085,886 | B2 | 8/2006 | Hsu et al. |
| 7,085,907 | B2 | 8/2006 | Ash et al. |

FOREIGN PATENT DOCUMENTS

JP   2004355623 A   12/2004

OTHER PUBLICATIONS

J. Menon, et al., "The Architecture of a Fault-Tolerant Cached RAID Controller", IEEE, 1993, pp. 76-86.
T.E. Potok, et al., "VIPAR: Advanced Information Agents Discovering Knowledge in an Open and Changing Environment", Submitted Dec. 2002: IIIS Agent Based Computing, Orlando, Jul. 2003, pp. 1-7.
A. Thomasian "Performance Comparison of Mirrored Disk Scheduling Methods with a Shared Non-Volatile Cache", Distributed and Parallel Databases, vol. 18, No. 3, Nov. 2005.

*Primary Examiner*—Christian P Chace
*Assistant Examiner*—Hashem Farrokh
(74) *Attorney, Agent, or Firm*—David W. Victor; Konrad Raynes & Victor LLP

(57) ABSTRACT

Provided are a method, system, and article of manufacture for copying data from a first cluster to a second cluster to reassign storage areas from the first cluster to the second cluster. An operation is initiated to reassign storage areas from a first cluster to a second cluster, wherein the first cluster includes a first cache and a first storage unit and the second cluster includes a second cache and a second storage unit. Data in the first cache for the storage areas to reassign to the second cluster is copied to the second cache. Data in the first storage unit for storage areas remaining assigned to the first cluster is copied to the second storage unit.

32 Claims, 5 Drawing Sheets

COPYING DATA FROM A FIRST CLUSTER TO A SECOND CLUSTER TO REASSIGN STORAGE AREAS FROM THE FIRST CLUSTER TO THE SECOND CLUSTER

BACKGROUND OF THE INVENTION

1. Field of the Invention

The present invention relates to a method, system, and article of manufacture for copying data from a first cluster to a second cluster to reassign storage areas from the first cluster to the second cluster.

2. Description of the Related Art

In a dual cluster system, each cluster includes a processing complex, cache and non-volatile storage unit (NVS). Each cluster is assigned a plurality of volumes, where volumes may be grouped in Logical Subsystems (LSSs). Data being written to a volume may be stored in the cache of the cluster to which the data is assigned. For cache fast write (CFW), a copy of data is only maintained in the cache of the cluster to which the data is assigned. CFW data is not protected from a reboot or power loss, and may comprise easily reconstructed data, such as sorted lists, indexes, etc. For Direct Access Storage Device (DASD) fast write (DFW) data, a copy of data in cache is also copied to the NVS of the other cluster to provide a backup copy. DFW data may comprise customer data, which is protected from loss. Sequential Fast Write (SFW) data and modified metadata are data stored in cache and information on the data, such as the track identifier (ID), may be stored in the NVS of the other cluster. In this way, if there is a failure, information on the data storage location of the data that was in cache is preserved.

A failover operation is initiated if one cluster fails or requires service or maintenance. As part of a failover operation, all volumes or LSSs assigned to the removed cluster are reassigned or failovered to the surviving or sole operating cluster. In the event the removed cluster recovers, then a failback to dual mode operation commences to reassign volumes back to the recovered cluster to return to dual cluster mode operations. As part of the failback to dual mode, the first cluster will destage all data in the cache and NVS to the storage. If the destage operation succeeds, then volumes, e.g., LSSs, will be reassigned from the operating single cluster to the recovered cluster to operate in dual mode. If the destage operation fails, then the clusters still operate in single cluster mode where the surviving cluster maintains the assignment of all the volumes. In such case, the recovered cluster remains removed from operations.

SUMMARY

Provided are a method, system, and article of manufacture for copying data from a first cluster to a second cluster to reassign storage areas from the first cluster to the second cluster. An operation is initiated to reassign storage areas from a first cluster to a second cluster, wherein the first cluster includes a first cache and a first storage unit and the second cluster includes a second cache and a second storage unit. Data in the first cache for the storage areas to reassign to the second cluster is copied to the second cache. Data in the first storage unit for storage areas remaining assigned to the first cluster is copied to the second storage unit.

In further embodiments, the data copied from the first storage unit to the second storage unit comprises identifiers of data for the storage areas remaining assigned to the first cluster in the first cache.

In further embodiments, the copied identifiers are for data of a first type of data in the first cache. A copy of data of a second type in the first cache that remains assigned to the first cluster is copied to the second storage unit.

In further embodiments, the copying of the data from the first cache to the second cache comprises copying, by the first cache, the data to copy from the first cache to the second cache; sending, by the first cache, a first message to the second cache to commit the copied data, wherein the second cluster initiates management of the storage areas of the copied data in response to the first message; sending, by the second cache, a second message to the first cache indicating that the copied data was committed; and discarding, by the first cache, the copied data from the first cache in response to the second message.

In further embodiments, the operation of copying data for storage areas remaining assigned to the first cluster to the second storage unit comprises: sending, by the first cache, a first message to the second storage unit to add an identifier of the data in the first cache that remains assigned to the first cluster; sending, by the second storage unit, a second message to the first cache indicating that the identifier was added; and removing, by the first cache, the identifier added to the second storage unit from the first storage unit.

In further embodiments, an identifier of the copied data is maintained in the first storage unit. The first cache sends the identifier in the first storage unit of the copied data and the second cache updates a cache control block for the copied data to indicate the identifier in the first storage unit.

In further embodiments, the operation of copying the data for storage areas remaining assigned to the first cluster to the second storage unit comprises: copying, by the first cache, the data to copy from the first cache to the second storage unit; sending, by the first cache, a first message to the second storage unit to commit the copied data, wherein the second cluster takes ownership of the copied data in response to the first message; sending, by the second storage unit, a second message to the first cache indicating that the copied data was committed; in response to the second message, updating, by the first cache, a cache control block to indicate the copied data in the second storage unit; and discarding, by the first cache, the copied data from the first storage unit.

In further embodiments, in response to the reassign operation, a command is issued to destage data from the first cache and the first storage unit to the storage areas. In response to the destage of data failing, the operations of moving the data from the first cache to the second cache and moving the data from the first storage unit to the second storage unit are performed, wherein the data is not moved from the first cache and the first storage unit in response to the destage of the data completing.

In further embodiments, data in the first cache copied to the second cache is discarded and data in the first storage unit copied to the second storage unit is discarded.

In a further provided, method, system, and article of manufacture an operation is initiated to reassign storage areas from a first cluster to a second cluster. The first cluster includes a first cache and a first storage unit and the second cluster includes a second cache and a second storage unit. For first data in the first cache of a first type for storage areas remaining assigned to the first cluster, data corresponding to the first data is copied to the second storage unit and the first data is not copied to the second cache. For second data in the first cache of the first type for storage areas reassigned to the second cluster, the second data is copied from the first cache to the second cache. For third data in the first cache of a second type for storage areas remaining assigned to the first cluster, a copy of the third data is copied to the second storage unit and the determined third data in the first cache is not copied to the second cache. For fourth data in the cache of the second type for storage areas reassigned to the second cluster, the determined fourth data in the first cache is copied to the second cache.

In further embodiments, the first type of data comprises metadata or data from storage areas that is stored in one of the first and second caches and an identifier of the data or metadata stored in one of the first and second caches is stored in one of the first and second storage units respectively, and wherein the second type of data comprises data that is stored in one of the first and second caches and a copy of the data is stored in one of the second and first storage units, respectively.

In further embodiments, for fifth data of a third type for storage areas reassigned to the second cluster, the copying of the data from the first cache to the second cache comprises copying the fifth data from the first cache to the second cache, and wherein there is no data corresponding the data of the third type maintained in one of the first and second storage units.

DETAILED DESCRIPTION

Figure 1:
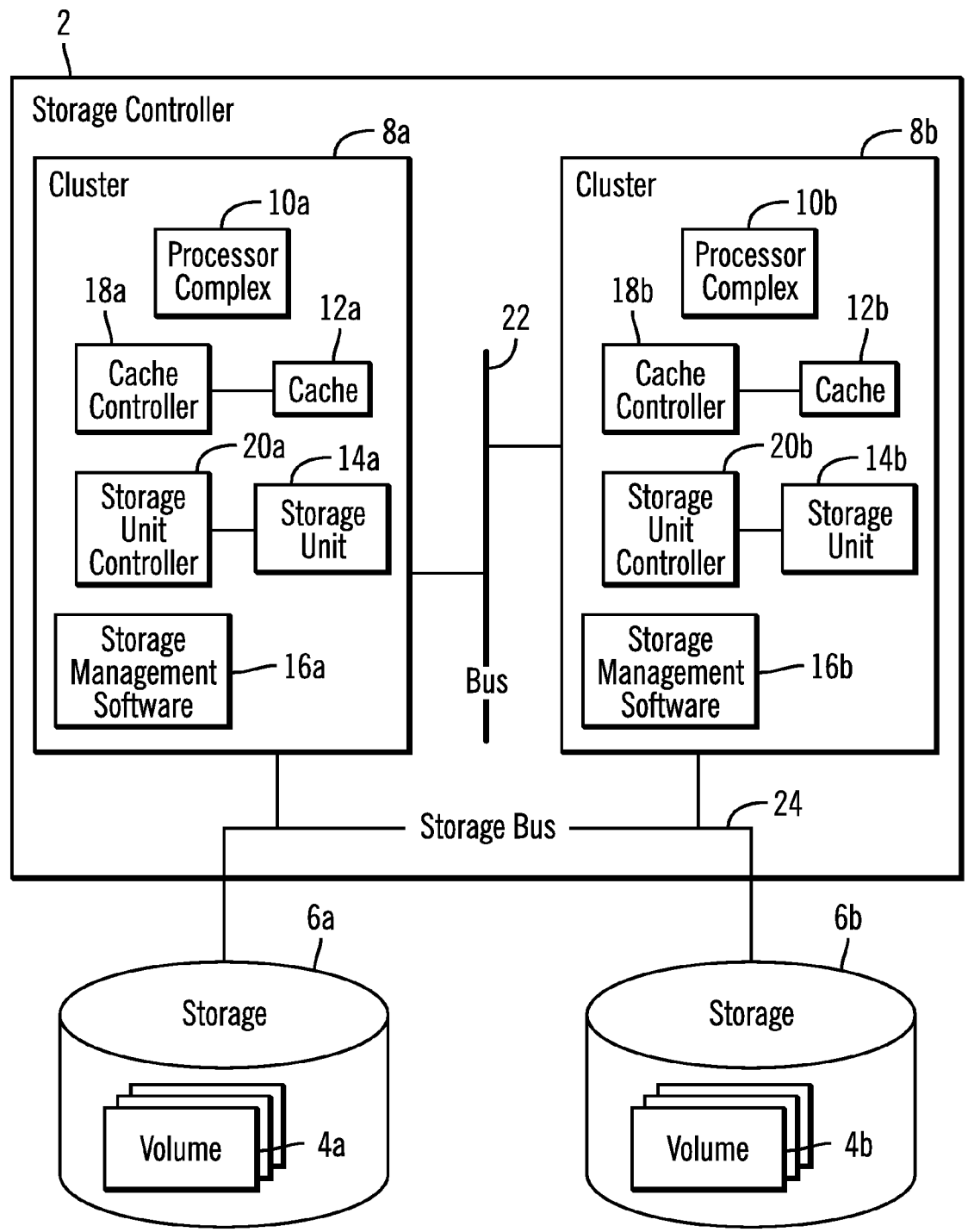
FIG. 1 illustrates an embodiment of a computing environment.

FIG. 1 illustrates an embodiment of a network computing environment. A plurality of hosts (not shown) may submit Input/Output (I/O) requests to a storage controller 2 to access data at volumes 4a, 4b (e.g., Logical Unit Numbers, Logical Devices, Logical Subsystems, etc.) in storages 6a, b. The storage controller 2 includes at least two clusters 8a, 8b. Each cluster 8a, 8b includes a processor complex 10a, 10b, a cache 12a, 12b, and a storage unit 14a, 14b to backup data in the cache 12a, 12b depending on the type of data in the cache 12a, 12b. In certain embodiments, the storage units 14a, 14b may provide non-volatile storage of data, such as non-volatile storage units or memory devices. The clusters 8a, 8b receive I/O requests from the hosts and buffer the requests and write data in their respective cache 12a, 12b directed to the storage 6a, 6b. Each cluster 8a, 8b includes storage management software 16a, 16b executed by the processor complexes 10a, 10b to manage I/O requests.

Cache controllers 18a, 18b provide circuitry to manage data in the caches 12a, 12b and storage unit controllers 20a, 20b provide circuitry to manage data in the storage units 14a, 14b. In one embodiment, the cache controllers 18a, 18b include circuitry and a Direct Memory Access (DMA) engine to copy data directly from the caches 12a, 12b to the cache or storage unit 14a, 14b in the other cluster 8a, 8b. In this way, the processor complexes 10a, 10b may offload data movement operations to their respective cache controllers 18a, 18b.

In one embodiment, the caches 12a, 12b may comprise a volatile storage unit that is external to the processor complex 10a, 10b or comprise an "on-board" cache of the processor complex 10a, 10b, such as the L2 cache. In one embodiment, the storage units 14a, 14b may comprise a non-volatile storage unit (NVS), such as a non-volatile memory, e.g., battery backed-up Random Access Memory (RAM), static RAM (SRAM), etc. Alternative memory and data storage structures known in the art may be used for the caches 12a, 12b and storage units 14a, 14b.

A bus 22 provides a communication interface to enable communication between the clusters 8a, 8b, and may utilize communication interface technology known in the art, such as Peripheral Component Interconnect (PCI) bus or other bus interfaces, or a network communication interface. Further, the bus 22 may comprise a processor Symmetrical Multi-Processor (SMP) fabric comprising busses, ports, logic, arbiter, queues, etc. to enable communication among the cores and components in the processor complexes 10a, 10b. The cache controllers 18a, 18b may DMA or directly copy data from their respective caches 12a, 12b over the bus 22 to the cache 12a, 12b or storage unit 14a, 14b in the other cluster 8a, 8b.

The clusters 8a, 8b are both capable of accessing volumes 4a, 4b in storage systems 6a, 6b over a shared storage bus 24, which may utilize a suitable storage communication interface known in the art. The storage management software 16a, 16b may also maintain an assignment of volumes 4a, 4b to clusters 8a, 8b owning a volume or group of volumes in the attached storages 6a, 6b, such that an owner cluster 8a, 8b handles the writes to those volumes 4a, 4b that cluster owns by caching the write data and executing the write against the volume.

The clusters 8a, 8b in the storage controller 2 comprise separate processing systems, and may be on different power boundaries and implemented in separate hardware components, such as each cluster implemented on a separate motherboard. The storages 6a, 6b may comprise an array of storage devices, such as a Just a Bunch of Disks (JBOD), Direct Access Storage Device (DASD), Redundant Array of Independent Disks (RAID) array, virtualization device, tape storage, flash memory, etc.

Figure 2:
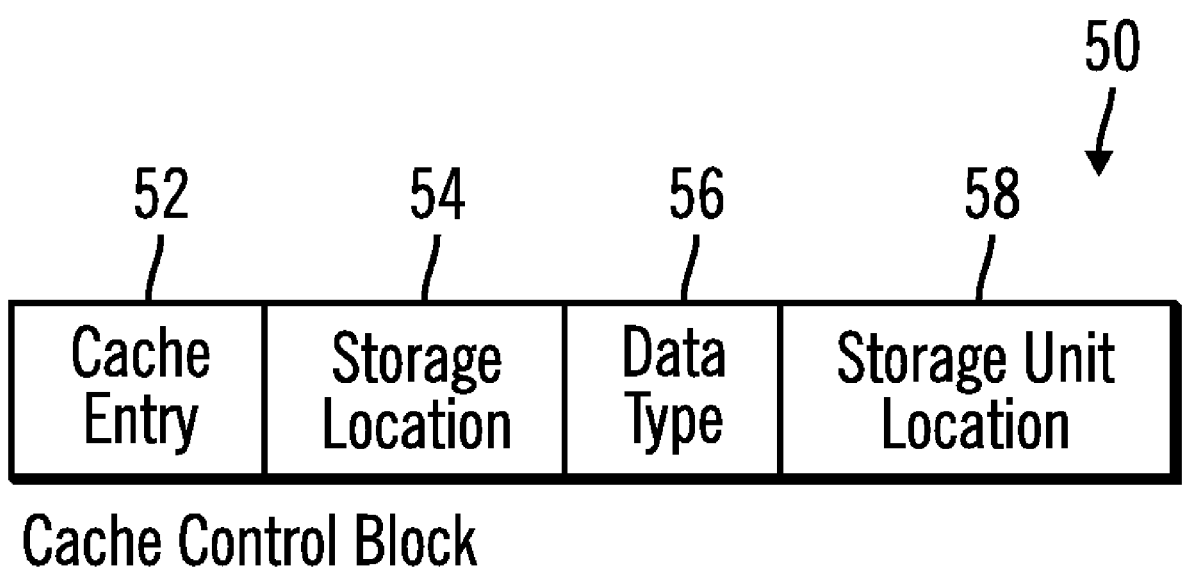
FIG. 2 illustrates an embodiment of information in a cache control block.

FIG. 2 illustrates an embodiment of a cache control block 50 the cache controllers 18a, 18b maintain for an entry in the cache 12a, 12b. The cache control block 50 includes a cache entry 52 identifying one or more entries in cache 12a, 12b; a storage location 54 identifying the location from storage 6a, 6b, e.g., track, volume 4a, 4b, etc., storing the data; a data type 56 indicating the type of data in cache 12a, 12b, such as Cache Fast Write (CFW), Sequential Fast Write (SFW), modified metadata, and DASD Fast Write (DFW); and a storage unit location 58 identifying the location in the storage unit 14a, 14b having data corresponding to the entry in cache 12a, 12b. If the data type 56 is CFW, then there is no data maintained in one of the storage units 14a, 14b for the data in cache 12a, 12b. If the data type 56 comprises SFW or modified metadata, then the corresponding data in one of the storage units 14a, 14b for the data in cache 12a, 12b comprises the entry, such as the track identifier entry, in the storage unit 14a, 14b having the location of the data in the storage 6a, 6b, such as the track identifier. If the data type 56 comprises DFW data, then the corresponding data in one of the storage units 14a, 14b for the data in cache 12a, 12b comprises the segments in storage unit 14a, 14b maintaining a copy of the data in the cache 12a, 12b.

Figure 3:
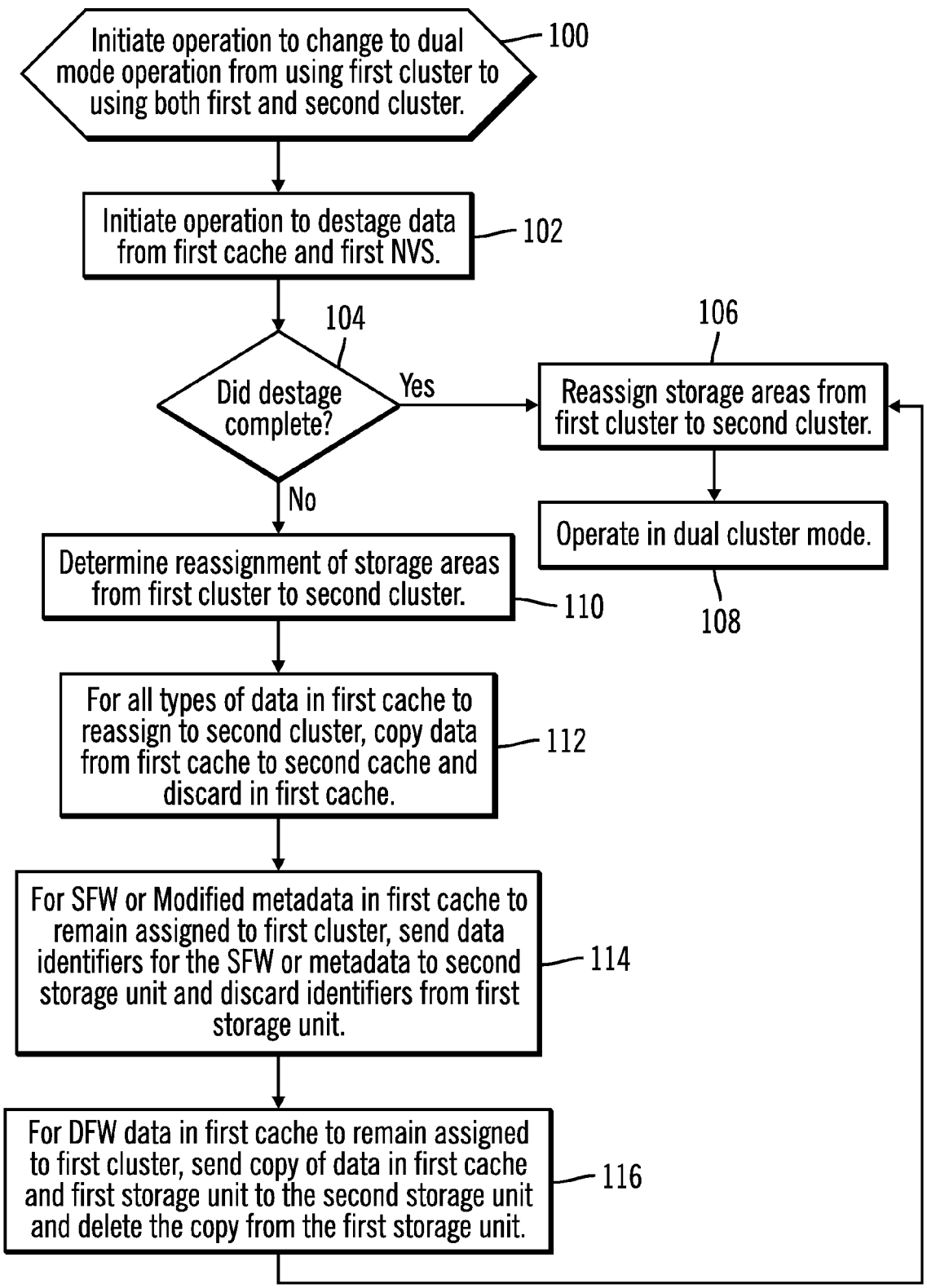
FIG. 3 illustrates an embodiment of operations to change from single cluster mode to dual cluster mode.

FIG. 3 illustrates an embodiment of operations performed by the storage management software 16a, 16b of the single operating cluster 8a, 8b to initiate a change from single cluster mode to dual cluster mode using both clusters. In one embodiment, a previous failover may have caused the storage controller 2 to switch to single cluster mode if one cluster 8a, 8b failed or was taken-down for service. During single cluster mode, all the LSSs and volumes 4a, 4b would have been assigned to the operating single cluster. The operations of FIG. 3 are described with respect to a cluster operating in single cluster mode as a first cluster 8a, having a first cache 12a, first storage unit 14a, etc., and the recovered cluster to which volumes 4a, 4b are to be reassigned as a second cluster 8b, having second cache 12b, second storage unit 14b, etc. However, either cluster 8a, 8b may operate as the operating cluster 8a, 8b in single cluster mode and either cluster 8a, 8b may operate as the recovered cluster 8a, 8b being added to provide dual cluster mode operation. Upon initiating (at block 100) the operation to switch from dual cluster mode to single cluster mode operation, the storage management software 16a in the operating first cluster 8a destages (at block 102) all data from the first cache 12a and first storage unit 14a to the storages 6a, 6b. If (at block 104) the destage operation completed successfully, then the storage management software 16a reassigns (at block 106) storage areas from the first cluster 8a to the second cluster 8b, such as by assigning all odd LSSs or volumes to the second cluster 8b, where even LSSs remain assigned to the first cluster 8a. The storage management software 16a of the first cluster 8a communicates with second cluster 8b over the bus 22 to facilitate the reassignment. After reassignment, the clusters 8a, 8b operate in dual cluster mode.

If (at block 104) the destage did not complete successfully, then the storage management software 16a initiates operations to copy data from the first cache 12a to the second cache 12b for storage areas, e.g., tracks, volumes, LSSs, reassigned to the recovered cluster 8b and copy data from the first storage unit 14a to the second storage unit 14b for storage areas remaining assigned to the first cluster 8a. In this way, data is moved from the first cluster 8a components to the second cluster components 8b for dual mode operation. To accomplish this, the storage management software 16a determines (at block 110) the reassignment of storage areas, e.g., volumes, LSSs, etc., from the first cluster 8a to the second cluster 8b. For any type of data (e.g., CFW, DFW, SFW, modified metadata, etc.) in the first cache 12a to reassign to the second cluster 8b, the storage management software 16a initiates operations (at block 112) to copy data from the first cache 12a to the second cache 12b and discard the copied data in the first cache 12a.

For data in the first cache 12a to remain assigned to first cluster 8a of a type having corresponding data identifiers (e.g., track identifiers, etc.) of the data stored in the first storage unit 14a (such as the case for SFW or modified metadata), the storage management software 16a initiates operations to send (at block 114) the data identifiers for the SFW or metadata (data whose storage location identifiers are in the first storage unit 14a) to the second storage unit 14b and discard the copied identifiers from the first storage unit 14a.

For data in the first cache 12a to remain assigned to the first cluster 8a for which a copy of the data in the first cache 12a is stored in the storage unit 14a, such as DFW data, the storage management software 16a initiates an operation (at block 116) to send a copy of the data in the first cache 12a, which copy is also maintained in the first storage unit 14a, to the second storage unit 14b and delete the copy from the first storage unit 14a. For data in the first cache 12a for which no data is maintained in a storage unit 14a, 14b, such as CFW data, no action is taken with respect to the storage units 14a, 14b.

After transferring all data as needed from the first cache 12a to the second cache 12b and to the second storage unit 14b, such that data is stored in the location according to a dual mode configuration, control proceeds to block 106 to complete the reassignment and transfer to dual mode cluster operations.

In certain embodiments, the operations to transfer the data from the first cache 12a to the second cache 12b may be offloaded to the cache controller 18a, such that the storage management software 16a requests the copying and the cache controller 18a manages the communication with the other cluster 8b to copy the data to the second cache 12b. In this way, the management of the copying operations is offloaded from the processor complex 10a to the cache controller 18a. The cache controllers 18a, 18b may communicate with each other and the storage units 14a, 14b over the bus 22.

Figure 4:
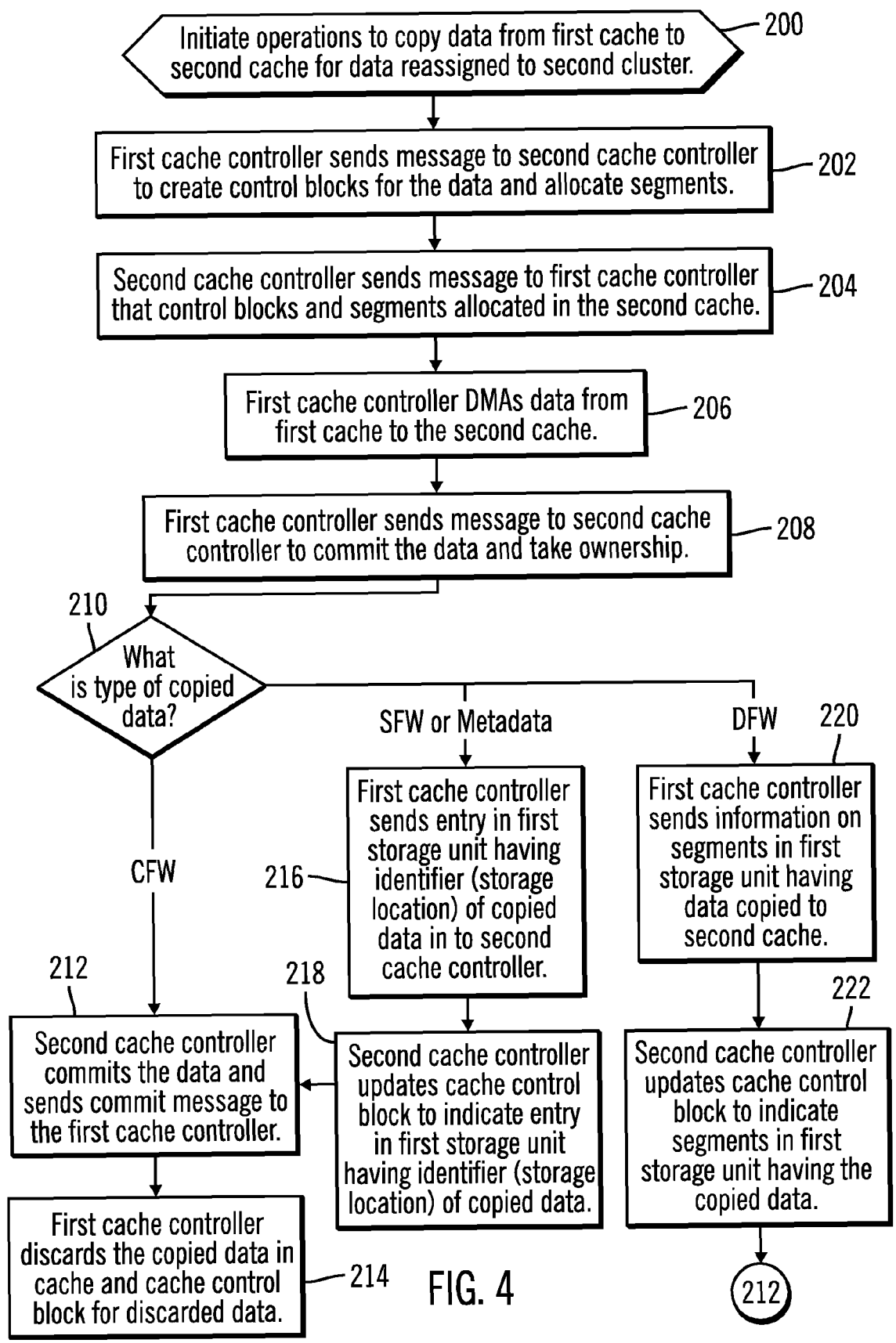
FIG. 4 illustrates an embodiment of operations to copy data from a first cache to a second cache for data reassigned to a second cluster.

FIG. 4 illustrates an embodiment of operations to copy data from a first cache 12a to a second cache 12b for data being reassigned to the second cluster 8b. The operations described with respect with the cache controllers 18a and 18b to copy data from the first cache 12a to the second cache 12b may also be performed by the other cache controller 18b and 18a, respectively, to copy data from the cache 12b to cache 12a. Thus, both cache controllers 18a, 18b are capable of performing all operations described with respect to one of the cache controllers 18a, 18b.

The cache controller 18a initiates operations (at block 200) to copy data from the first cache 12a to the second cache 12b for data reassigned to the second cluster 8b. The cache controller 18a may be invoked to do the copying in response to a request from the storage management software 16a. The first cache controller 18a sends (at block 202) a message to the second cache controller 18b to create control blocks for the data and allocate segments in the second cache 12b. In response, the second cache controller 18b allocates the control block and segments and sends (at block 204) a message to the first cache controller 18a that control blocks and segments in the second cache 12b were allocated. The first cache controller 18a then transfers (at block 206) data from first cache 12a to the second cache 12b. In one embodiment, the first cache controller 18 may transfer the data using Direct Memory Access (DMA) technology to bypass the processor complexes 10a, 10b for the transfer. Alternative data transfer techniques may be used in alternative embodiments. After transferring the data, the first cache controller 18a sends (at block 208) a message to the second cache controller 18b to commit the transferred data and take ownership of the data or tracks.

The next operations the cache controller 18a performs to complete the copying depends on the type of the cached data. For instance, if (at block 210) there is no data in the storage unit 14a corresponding to the data copied from the first cache 12a to transfer to the second storage unit 14b, e.g., CFW data, then the second cache controller 18b commits (at block 212) the data and sends commit message to the first cache controller 18a. The first cache controller 18a discards (at block 214) the copied data in the first cache 12a and the cache control block 50 (FIG. 2) for the discarded data. For copied data from the first cache 12a not having any corresponding data in the first storage unit 14a, such as data (track) IDs or a copy of the data, e.g., CFW data, there is no action taken with respect to the storage units 14a, 14b.

If (at block 210) the first storage unit 14a has data identifiers identifying the location in storage 6a, 6b, e.g., track IDs, of the data copied from the first cache 12a to the second cache 12b, e.g., SFW data or modified metadata, then the first cache controller 18a sends (at block 216) to the second cache controller 18b the entry in the first storage unit 14a of the identifier, such as the location in storage 6a, 6b, track ID, etc., of the data copied to the second cache 12b. The second cache controller 18b updates (at block 218) the cache control block 50 storage unit location information 58 to indicate the entry in the first storage unit 14a having the identifier of the copied data, such as the location in the storage 6a, 6b, e.g., track ID. Control then proceeds to block 212 to complete the copying. In this way, the data identifiers of data reassigned to the second cluster 8b remain in the first cluster 8a, with information on their location in the first storage unit 14a indicated in the cache control block 50.

If (at block 210) the first storage unit 14a has a copy of the data copied from the first cache 12a to the second cache 12b, e.g., DFW data, then the first cache controller 18a sends (at block 220) information on the segments in the first storage unit 14a including the data copied to the second cache 12b. The second cache controller 18b updates (at block 222) the cache control block 50 to indicate in the storage unit location information 58 (FIG. 2) the segments in the first storage unit 14a having the copied data. In this way, the first storage unit 14a maintains a backup copy of the cache data reassigned to the second cluster 8b. From block 222, control proceeds to block 212 to complete the copying and reassignment.

With the operations of FIG. 4, for data reassigned to the second cluster 8b, any data in the first storage unit 14a corresponding to the data copied from the first cache 12a to the second cache 12b, such as data identifiers (e.g., storage locations, track IDs, etc.) or a copy of the data copied data, remains in the first storage unit 14a. However, control block information for the second cache 12b is updated to indicate the location in the first storage unit 14a having the data identifier or storage location.

Figure 5:
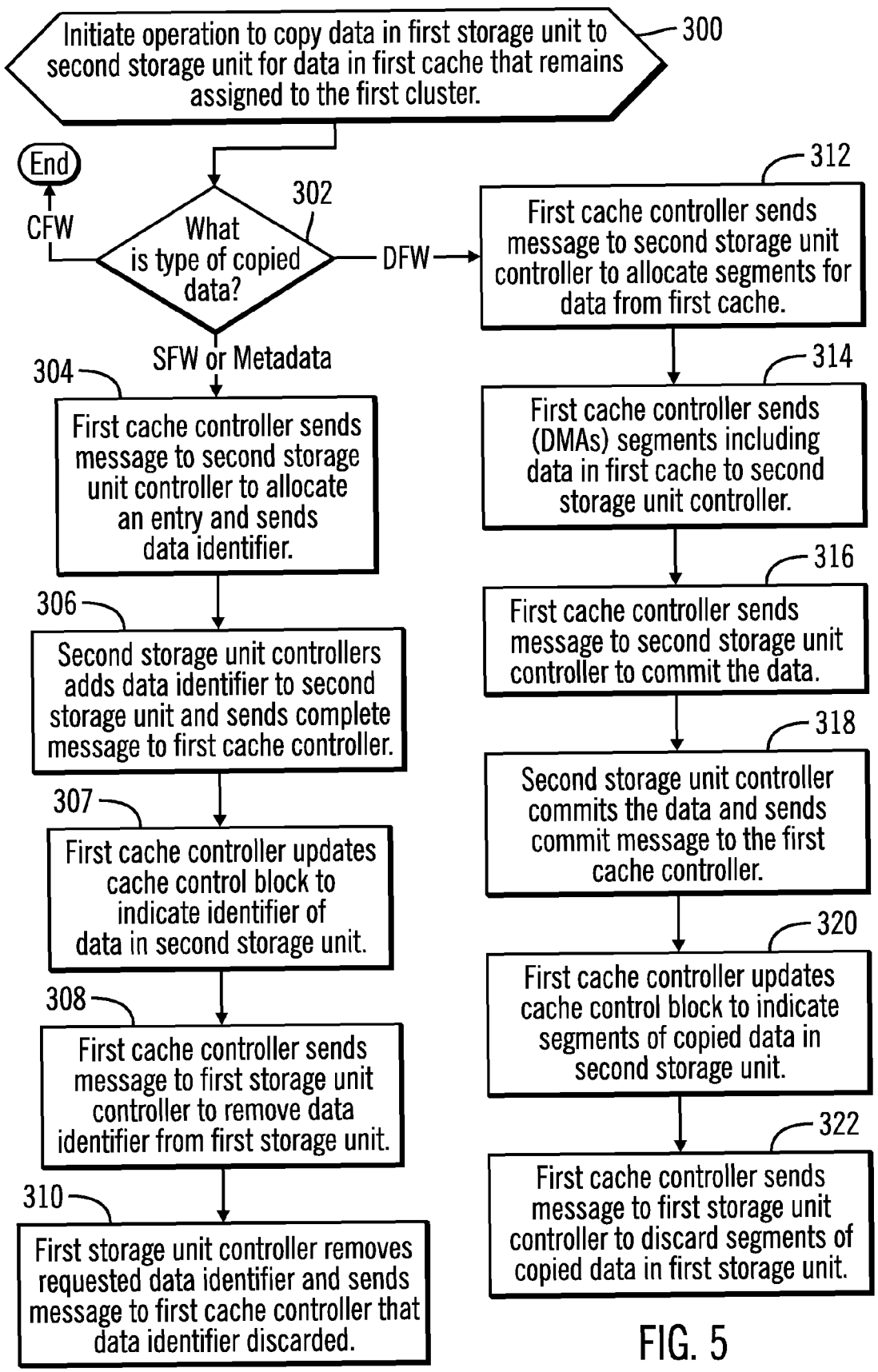
FIG. 5 illustrates an embodiment of operations to copy data in a first storage unit to a second storage unit for data remaining assigned to the first cluster.

FIG. 5 illustrates an embodiment of operations to copy data to the second storage unit 14b for data that remains assigned to the first cluster 8a so that cache 12a will cache data for the data managed by the first cluster 8a. The operations described with respect to the cache controllers 18a and 18b and storage unit controllers 20a and 20b to transfer data to the second storage unit 14b may also be performed by the other cache 18a, 18b and storage unit controllers 20a, 20b. Thus, both cache controllers 18a, 18b and storage unit controllers 20a, 20b are capable of performing all operations described with respect to one of the cache controllers 18a, 18b and storage unit controllers 20a, 20b. The cache controller 18a initiates operations (at block 300) to copy data in the first storage unit 14a to the second storage unit 14b for data in the first cache 12a that remains assigned to the first cluster 8a. The cache controller 18a may be invoked to copy the data to the second storage unit 14b in response to a request from the storage management software 16a.

At block 302, the operations performed depend on the type of data. If there is no data in the storage unit 14a corresponding to data copied in the first cache 12a remaining assigned the second storage unit 14b, e.g., CFW data, then control ends because there is nothing to be maintained in the second cluster 8b for such data assigned to the first cluster 8a maintained in the first cache 12a.

If (at block 302) the first storage unit 14a has data identifiers identifying the location in storage 6a, 6b, e.g., track IDs, of the data assigned to the first cluster 8a, e.g., SFW data or modified metadata, then the first cache controller 18a sends (at block 304) a message to the second storage unit controller 20b to allocate an entry for the data identifier, e.g., storage 6a, 6b location, track ID, etc., and sends the data identifier. The second storage unit controller 20b adds (at block 306) the data identifier to the second storage unit 14b and sends a message to the first cache controller 18a. In response to the message, the first cache controller 18a updates (at block 307) the cache control block 50 to indicate the identifier of the data as stored in the second storage unit 14b and sends (at block 308) a message to the first storage unit controller 20a to remove from the first storage unit 14a the data identifier added to the second storage unit 14b. The first storage unit controller 20a then removes (at block 310) the requested data identifier and sends a message to the first cache controller 18a that the data identifier was discarded.

If (at block 310) the first storage unit 14a has a copy of the data in the first cache 12a remaining assigned to the first cluster 8a, e.g., DFW data, then the first cache controller 18a sends (at block 312) a message to the second storage unit controller 20b to allocate segments for data from the first cache 12a, a copy of which is maintained in the first storage unit 14a. The first cache controller 18a then sends (e.g., DMAs) (at block 314) segments including the data in the first cache 12a to the second storage unit controller 20b and then sends (at block 316) a message to the second storage unit controller 20b to commit the sent data. The second storage unit controller 20b then commits (at block 318) the data and sends a message to the first cache controller 18a. The first cache controller 18a then updates (at block 320) the first cache 12a control block 50 storage unit location information 58 (FIG. 2) to indicate the segments of the copied data stored in the second storage unit 14b. The first cache controller 18a sends (at block 322) the message to the first storage unit controller 20a to discard the segments of the copied data in first storage unit 14a now found in found in the second storage unit 14b.

The result of the copy operations in FIGS. 3, 4, and 5 is to ensure that when reassigning data from the first storage cluster to the second storage cluster, data being reassigned should be copied from the first cache to the second cache. Further, the cache control block in the second cache in the second cluster for the reassigned data should be updated to indicate that the first storage unit in the first storage cluster maintains data corresponding to the data in cache, such as the data storage location or a copy of the data. Yet further, the data corresponding to the data remaining assigned to the first storage cluster, which is currently in the first storage unit, is copied to the second storage unit in the second cluster. With the described operations, the backup copy of the data corresponding to the data in the cache remains in a different cluster from the cluster whose cache maintains the data, i.e., the cluster to which the data is assigned.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In described embodiments, different copy operations are performed with respect to the first and second storage units depending on the type of data, e.g., CFW, DFW, SFW, modified metadata. In additional embodiments, different or the same described operations may be performed with respect to other types of data having corresponding data maintained in the first and second storage units.

In the described embodiments, the data stored in the storage units 14a, 14b corresponding to the data in cache comprised a storage location or identifier of the data in cache or a copy of the data in cache. In alternative embodiments, different types of corresponding data may be maintained in the cache 12a, 12b and backup storage units 14a, 14b.

In the described embodiments, the copy operations to copy data between the caches 12a, 12b and storage units 14a, 14b are performed by the cache controllers 18a, 18b. In alternative embodiments, certain operations described as initiated by the cache controllers 18a, 18b may be performed by the storage management software 16a, 16b or other components in the clusters.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   initiating an operation to reassign storage areas from a first cluster to a second cluster, wherein the first cluster includes a first cache and a first storage unit and the second cluster includes a second cache and a second storage unit;
   copying data in the first cache for the storage areas to reassign to the second cluster to the second cache; and
   copying data in the first storage unit for storage areas remaining assigned to the first cluster to the second storage unit.

2. The method of claim 1, wherein the data copied from the first storage unit to the second storage unit comprises identifiers of data for the storage areas remaining assigned to the first cluster in the first cache.

3. The method of claim 2, wherein the copied identifiers are for data of a first type of data in the first cache, further comprising:
   copying a copy of data of a second type in the first cache that remains assigned to the first cluster to the second storage unit.

4. The method of claim 1, wherein the copying of the data from the first cache to the second cache comprises:

copying, by the first cache, the data to copy from the first cache to the second cache;

sending, by the first cache, a first message to the second cache to commit the copied data, wherein the second cluster initiates management of the storage areas of the copied data in response to the first message;

sending, by the second cache, a second message to the first cache indicating that the copied data was committed; and discarding, by the first cache, the copied data from the first cache in response to the second message.

5. The method of claim 1, wherein the operation of copying data for storage areas remaining assigned to the first cluster to the second storage unit comprises:

sending, by the first cache, a first message to the second storage unit to add an identifier of the data in the first cache that remains assigned to the first cluster;

sending, by the second storage unit, a second message to the first cache indicating that the identifier was added; and removing, by the first cache, the identifier added to the second storage unit from the first storage unit.

6. The method of claim 5, wherein an identifier of the copied data is maintained in the first storage unit, further comprising:

sending, by the first cache, the identifier in the first storage unit of the copied data; and updating, by the second cache, a cache control block for the copied data to indicate the identifier in the first storage unit.

7. The method of claim 1, wherein the operation of copying the data for storage areas remaining assigned to the first cluster to the second storage unit comprises:

copying, by the first cache, the data to copy from the first cache to the second storage unit;

sending, by the first cache, a first message to the second storage unit to commit the copied data, wherein the second cluster takes ownership of the copied data in response to the first message;

sending, by the second storage unit, a second message to the first cache indicating that the copied data was committed;

in response to the second message, updating, by the first cache, a cache control block to indicate the copied data in the second storage unit; and discarding, by the first cache, the copied data from the first storage unit.

8. The method of claim 1, further comprising:

in response to the reassign operation, issuing a command to destage data from the first cache and the first storage unit to the storage areas; and in response to the destage of data failing, performing the operations of moving the data from the first cache to the second cache and moving the data from the first storage unit to the second storage unit, wherein the data is not moved from the first cache and the first storage unit in response to the destage of the data completing.

9. The method of claim 1, further comprising:

discarding data in the first cache copied to the second cache; and discarding data in the first storage unit copied to the second storage unit.

10. A method, comprising:

initiating an operation to reassign storage areas from a first cluster to a second cluster, wherein the first cluster includes a first cache and a first storage unit and the second cluster includes a second cache and a second storage unit;

for first data of a first type in the first cache for storage areas remaining assigned to the first cluster, copying data corresponding to the first data to the second storage unit and the first data is not copied to the second cache;

for second data of the first type in the first cache for storage areas reassigned to the second cluster, copying the second data from the first cache to the second cache;

for third data of a second type in the first cache for storage areas remaining assigned to the first cluster, copying a copy of the third data to the second storage unit and the third data in the first cache is not copied to the second cache; and for fourth data of the second type in the first cache for storage areas reassigned to the second cluster, copying the fourth data in the first cache to the second cache.

11. The method of claim 10, wherein the first type of data comprises metadata or data from storage areas that is stored in one of the first and second caches and an identifier of the data or metadata stored in one of the first and second caches is stored in one of the first and second storage units respectively, and wherein the second type of data comprises data that is stored in one of the first and second caches and a copy of the data is stored in one of the second and first storage units, respectively.

12. The method of claim 10, further comprising:

for fifth data of a third type for storage areas reassigned to the second cluster, the copying of the data from the first cache to the second cache comprises copying the fifth data from the first cache to the second cache, and wherein there is no data corresponding the data of the third type maintained in one of the first and second storage units.

13. A system, comprising:

a first cluster including a first cache and a first storage unit;

a second cluster including a second cache and a second storage unit; and code executed in the first cluster to perform operations, the operations comprising:

initiating an operation to reassign storage areas from the first cluster to the second cluster;

copying data in the first cache for the storage areas to reassign to the second cluster to the second cache; and copying data in the first storage unit for storage areas remaining assigned to the first cluster to the second storage unit.

14. The system of claim 13, wherein the data copied from the first storage unit to the second storage unit comprises identifiers of data for the storage areas remaining assigned to the first cluster in the first cache.

15. The system of claim 13, wherein the copying of the data from the first cache to the second cache comprises:

copying, by the first cache, the data to copy from the first cache to the second cache;

sending, by the first cache, a first message to the second cache to commit the copied data, wherein the second cluster initiates management of the storage areas of the copied data in response to the first message;

sending, by the second cache, a second message to the first cache indicating that the copied data was committed; and discarding, by the first cache, the copied data from the first cache in response to the second message.

16. The system of claim 13, wherein the operation of copying data for storage areas remaining assigned to the first cluster to the second storage unit comprises:
   sending, by the first cache, a first message to the second storage unit to add an identifier of the data in the first cache that remains assigned to the first cluster;
   sending, by the second storage unit, a second message to the first cache indicating that the identifier was added; and
   removing, by the first cache, the identifier added to the second storage unit from the first storage unit.

17. The system of claim 13, wherein the operation of copying the data for storage areas remaining assigned to the first cluster to the second storage unit comprises:
   copying, by the first cache, the data to copy from the first cache to the second storage unit;
   sending, by the first cache, a first message to the second storage unit to commit the copied data, wherein the second cluster takes ownership of the copied data in response to the first message;
   sending, by the second storage unit, a second message to the first cache indicating that the copied data was committed;
   in response to the second message, updating, by the first cache, a cache control block to indicate the copied data in the second storage unit; and
   discarding, by the first cache, the copied data from the first storage unit.

18. The system of claim 13, wherein the operations further comprise:
   in response to the reassign operation, issuing a command to destage data from the first cache and the first storage unit to the storage areas; and
   in response to the destage of data failing, performing the operations of moving the data from the first cache to the second cache and moving the data from the first storage unit to the second storage unit, wherein the data is not moved from the first cache and the first storage unit in response to the destage of the data completing.

19. A system, comprising:
   a first cluster including a first cache and a first storage unit;
   a second cluster including a second cache and a second storage unit; and
   code executed in the first cluster to perform operations, the operations comprising:
      initiating an operation to reassign storage areas from the first cluster to the second cluster;
      for first data of a first type in the first cache for storage areas remaining assigned to the first cluster, copying data corresponding to the first data to the second storage unit and the first data is not copied to the second cache;
      for second data of the first type in the first cache for storage areas reassigned to the second cluster, copying the second data from the first cache to the second cache;
      for third data of a second type in the first cache for storage areas remaining assigned to the first cluster, copying a copy of the third data to the second storage unit and the third data in the first cache is not copied to the second cache; and
      for fourth data of the second type in the first cache for storage areas reassigned to the second cluster, copying the fourth data in the first cache to the second cache.

20. The system of claim 19, wherein the first type of data comprises metadata or data from storage areas that is stored in one of the first and second caches and an identifier of the data or metadata stored in one of the first and second caches is stored in one of the first and second storage units respectively, and wherein the second type of data comprises data that is stored in one of the first and second caches and a copy of the data is stored in one of the second and first storage units, respectively.

21. An article of manufacture comprising a computer readable storage medium including code executed in a first cluster including a first cache and a first storage unit, wherein the first cluster is in communication with a second cluster including a second cache and a second storage unit, wherein the code causes operations to be performed, the operations comprising:
   initiating an operation to reassign storage areas from a first cluster to a second cluster, wherein the first cluster includes a first cache and a first storage unit and the second cluster includes a second cache and a second storage unit;
   copying data in the first cache for the storage areas to reassign to the second cluster to the second cache; and
   copying data in the first storage unit for storage areas remaining assigned to the first cluster to the second storage unit.

22. The article of manufacture of claim 21, wherein the data copied from the first storage unit to the second storage unit comprises identifiers of data for the storage areas remaining assigned to the first cluster in the first cache.

23. The article of manufacture of claim 22, wherein the copied identifiers are for data of a first type of data in the first cache, further comprising:
   copying a copy of data of a second type in the first cache that remains assigned to the first cluster to the second storage unit.

24. The article of manufacture of claim 21, wherein the copying of the data from the first cache to the second cache comprises:
   copying, by the first cache, the data to copy from the first cache to the second cache;
   sending, by the first cache, a first message to the second cache to commit the copied data, wherein the second cluster initiates management of the storage areas of the copied data in response to the first message;
   sending, by the second cache, a second message to the first cache indicating that the copied data was committed; and
   discarding, by the first cache, the copied data from the first cache in response to the second message.

25. The article of manufacture of claim 21, wherein the operation of copying data for storage areas remaining assigned to the first cluster to the second storage unit comprises:
   sending, by the first cache, a first message to the second storage unit to add an identifier of the data in the first cache that remains assigned to the first cluster;
   sending, by the second storage unit, a second message to the first cache indicating that the identifier was added; and
   removing, by the first cache, the identifier added to the second storage unit from the first storage unit.

26. The article of manufacture of claim 25, wherein an identifier of the copied data is maintained in the first storage unit, further comprising:
   sending, by the first cache, the identifier in the first storage unit of the copied data; and updating, by the second cache, a cache control block for the copied data to indicate the identifier in the first storage unit.

27. The article of manufacture of claim 21, wherein the operation of copying the data for storage areas remaining assigned to the first cluster to the second storage unit comprises:
   copying, by the first cache, the data to copy from the first cache to the second storage unit;
   sending, by the first cache, a first message to the second storage unit to commit the copied data, wherein the second cluster takes ownership of the copied data in response to the first message;
   sending, by the second storage unit, a second message to the first cache indicating that the copied data was committed;
   in response to the second message, updating, by the first cache, a cache control block to indicate the copied data in the second storage unit; and
   discarding, by the first cache, the copied data from the first storage unit.

28. The article of manufacture of claim 21, further comprising:
   in response to the reassign operation, issuing a command to destage data from the first cache and the first storage unit to the storage areas; and
   in response to the destage of data failing, performing the operations of moving the data from the first cache to the second cache and moving the data from the first storage unit to the second storage unit, wherein the data is not moved from the first cache and the first storage unit in response to the destage of the data completing.

29. The article of manufacture of claim 21, further comprising:
   discarding data in the first cache copied to the second cache; and
   discarding data in the first storage unit copied to the second storage unit.

30. An article of manufacture comprising a computer readable storage medium including code executed in a first cluster including a first cache and a first storage unit, wherein the first cluster is in communication with a second cluster including a second cache and a second storage unit, wherein the code causes operations to be performed, the operations comprising:
   initiating an operation to reassign storage areas from a first cluster to a second cluster, wherein the first cluster includes a first cache and a first storage unit and the second cluster includes a second cache and a second storage unit;
   for first data of a first type in the first cache for storage areas remaining assigned to the first cluster, copying data corresponding to the first data to the second storage unit and the first data is not copied to the second cache;
   for second data of the first type in the first cache for storage areas reassigned to the second cluster, copying the second data from the first cache to the second cache;
   for third data of a second type in the first cache for storage areas remaining assigned to the first cluster, copying a copy of the third data to the second storage unit and the third data in the first cache is not copied to the second cache; and
   for fourth data of the second type in the first cache for storage areas reassigned to the second cluster, copying the fourth data in the first cache to the second cache.

31. The article of manufacture of claim 30, wherein the first type of data comprises metadata or data from storage areas that is stored in one of the first and second caches and an identifier of the data or metadata stored in one of the first and second caches is stored in one of the first and second storage units respectively, and wherein the second type of data comprises data that is stored in one of the first and second caches and a copy of the data is stored in one of the second and first storage units, respectively.

32. The article of manufacture of claim 30, further comprising:
   for fifth data of a third type for storage areas reassigned to the second cluster, the copying of the data from the first cache to the second cache comprises copying the fifth data from the first cache to the second cache, and wherein there is no data corresponding the data of the third type maintained in one of the first and second storage units.

* * * * *